March 14, 1950     E. B. MILLER     2,500,851
DUST COLLECTOR

Filed Oct. 10, 1945     7 Sheets-Sheet 1

INVENTOR.
Ernest B. Miller
BY
A. D. Adams

March 14, 1950     E. B. MILLER     2,500,851
DUST COLLECTOR

Filed Oct. 10, 1945     7 Sheets-Sheet 2

INVENTOR.
Ernest B. Miller
BY A. L. Adams

March 14, 1950  E. B. MILLER  2,500,851
DUST COLLECTOR

Filed Oct. 10, 1945  7 Sheets-Sheet 3

INVENTOR.
Ernest B. Miller
BY
A. D. Adams

INVENTOR.
*Ernest B. Miller*
BY *A. D. Adams*

March 14, 1950     E. B. MILLER     2,500,851
DUST COLLECTOR

Filed Oct. 10, 1945     7 Sheets-Sheet 5

INVENTOR.
Ernest B. Miller
BY A. D. Adams

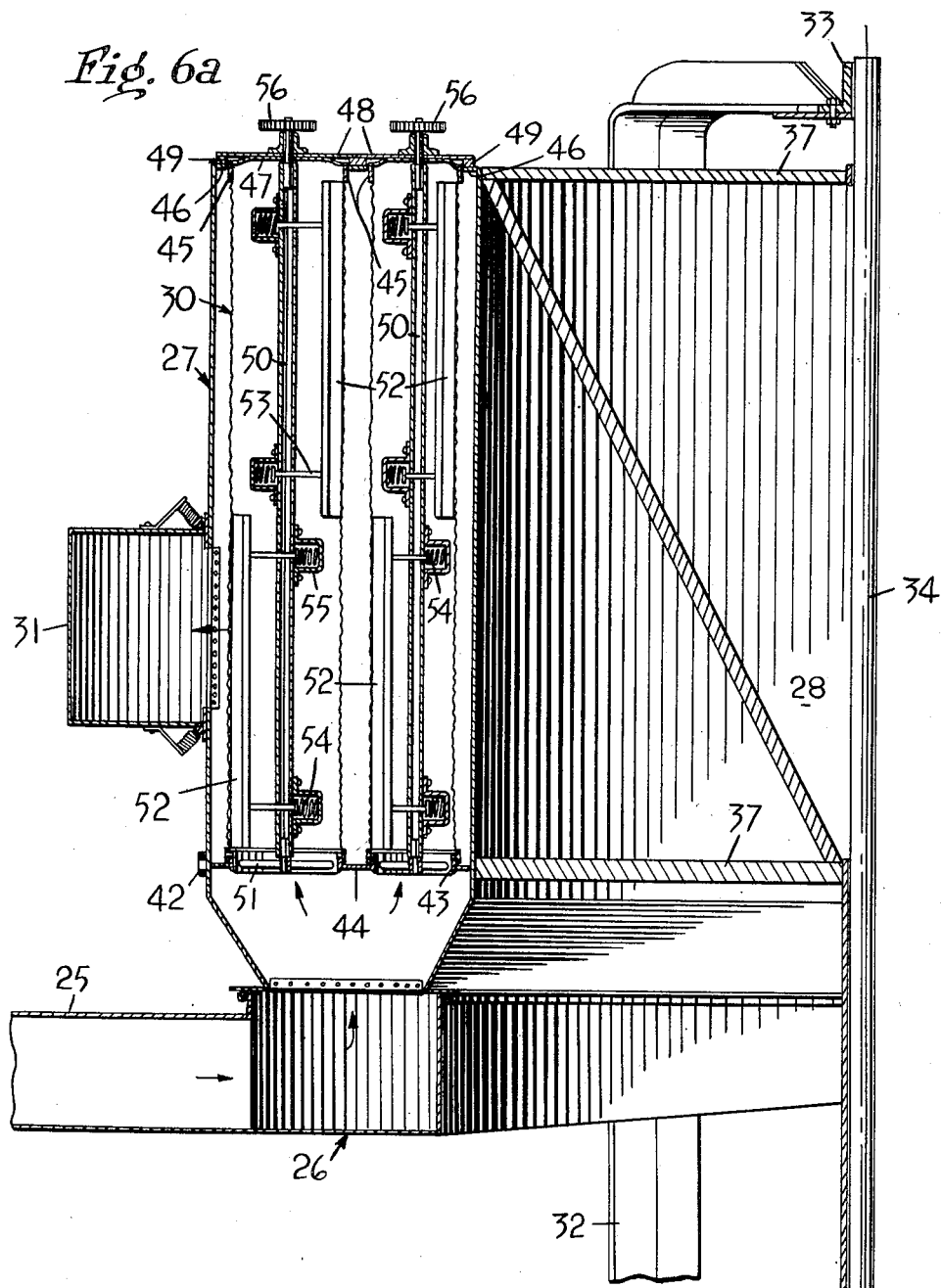

Patented Mar. 14, 1950

2,500,851

UNITED STATES PATENT OFFICE 2,500,851

DUST COLLECTOR

Ernest B. Miller, Houston, Tex.

Application October 10, 1945, Serial No. 621,407

10 Claims. (Cl. 183—53)

This invention relates to dust collectors to recover carbon black or to remove fine dust from gases. One of the objects of the invention is to provide a novel and efficient collecting machine of the rotary type designed to collect fine carbon particles from relatively hot flue gas delivered from a carbon black furnace. Another aim is to provide a collector of this type having readily removable and replaceable collector screen units to permit easy repair and to insure efficient and continuous operation.

Still another aim is to provide novel means for so directing the dust-laden gas through the screens as to form a filtering layer or pre-coat the screens for the subsequent recovery of the carbon black.

Another aim of the invention is to provide a novel arrangement of manifolds and seals to direct the flow of gas through the collector.

A further aim of the invention is to provide novel blow-back means for utilizing some of the cleansed gas to remove residual carbon black from the screens after mechanical brushes have removed the main deposit.

A still further aim of the invention is to provide a novel method of continuously collecting carbon black by pre-coating moving screens to provide a filtering layer; then depositing the carbon black on the pre-coated screens; then mechanically removing the deposit; and finally cleansing the screens by using some of the cleansed gas so that they will not become clogged.

Other aims and advantages of the invention will appear in the specification, when considered in connection with the accompanying drawings, wherein:

Figs. 6a and 6b are vertical sectional views taken on the line 6a—6b of Fig. 3;

The illustrative embodiment of the invention will be described as a carbon black collector, because it is particularly designed for that purpose. However, it will be understood by those skilled in the art that it is adapted for other purposes.

Figure 1:
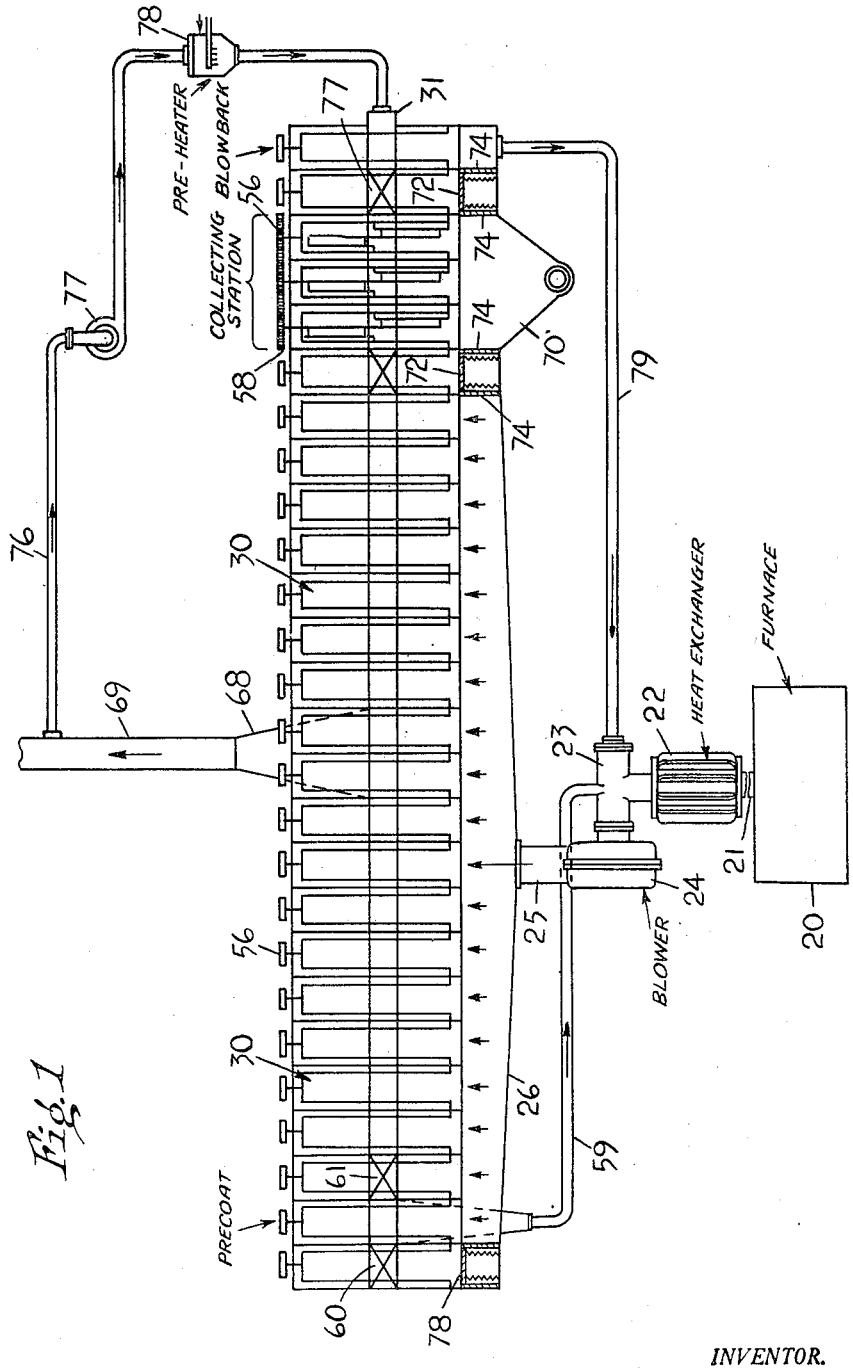
Fig. 1 is a schematic or developed view showing the collector spread open to illustrate its operation for collecting carbon black.

The preferred form of the machine is shown diagrammatically in Fig. 1 as being spread open to afford a clear understanding of the flow of the gas and the method of operation. It is there shown as being connected to receive flue gas from a carbon-black furnace 20, having an outlet flue 21 connected to heat exchanger 22 to cool the carbon-laden gas to a temperature of from 400° F. to 500° F.

Figure 2:
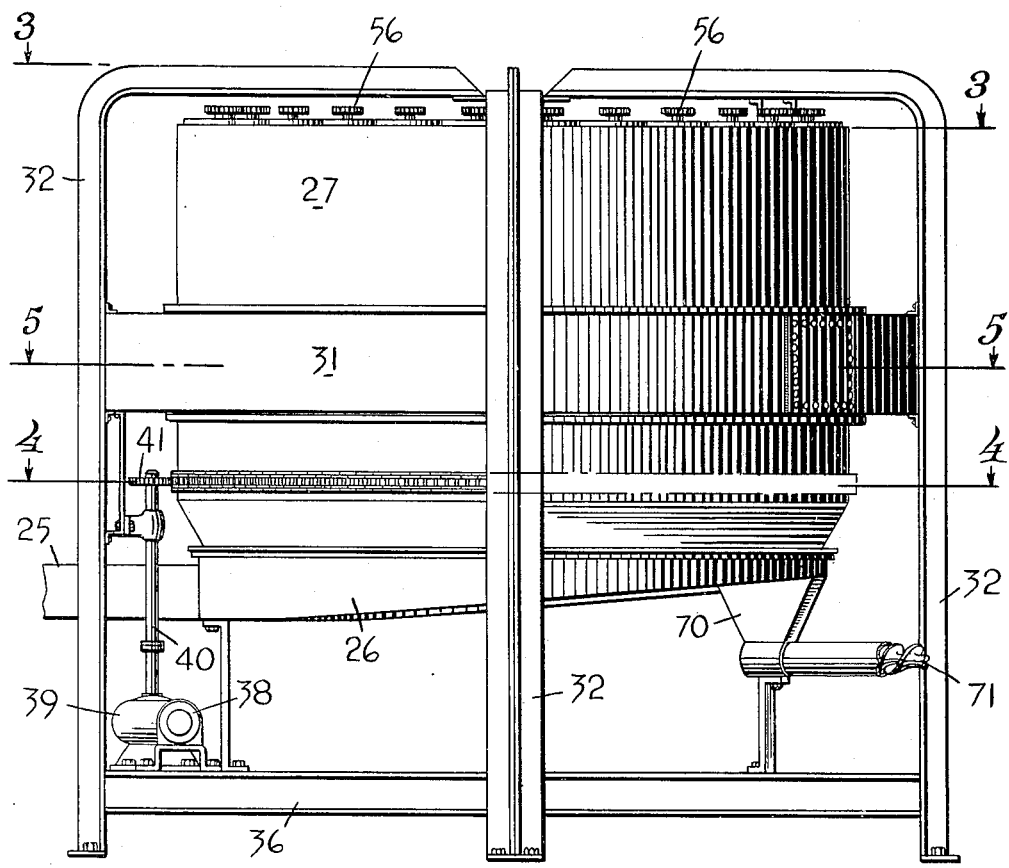
Fig. 2 is a side elevation of a rotary collector embodying the apparatus shown in Fig. 1.
Figure 10:
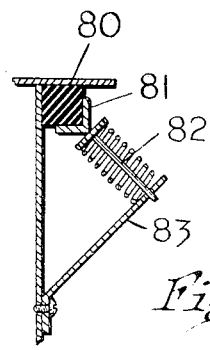
Fig. 10 is a fragmentary sectional view showing a spring-urged ring gasket between the bottom manifold and rotary drum or casing.
Figure 9:
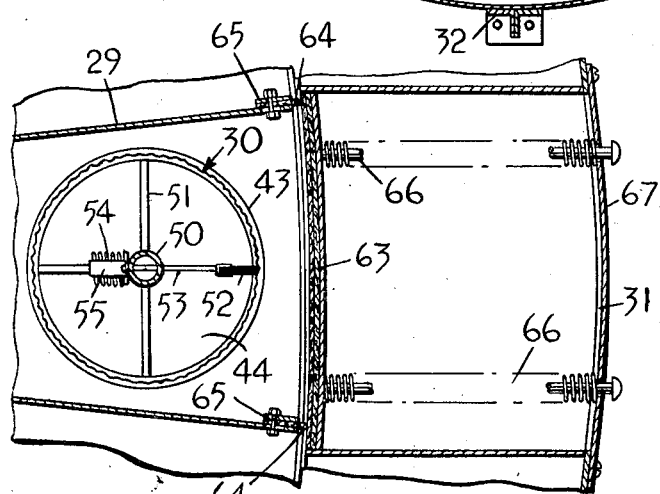
Fig. 9 is a fragmentary and enlarged horizontal sectional view showing a screen and a side manifold seal.

In this instance, the flue has a T fitting 23, with a branch leading to the intake side of an exhauster or fan blower 24 having a delivery duct 25 connected to a lower-ring-shaped manifold 26 at the bottom of the collector, which is in the form of a rotating, closed drum 27 having an inner concentric cylindrical wall 28 and mounted to rotate relative to the lower manifold (Figs. 2 and 9).

Figure 6B:
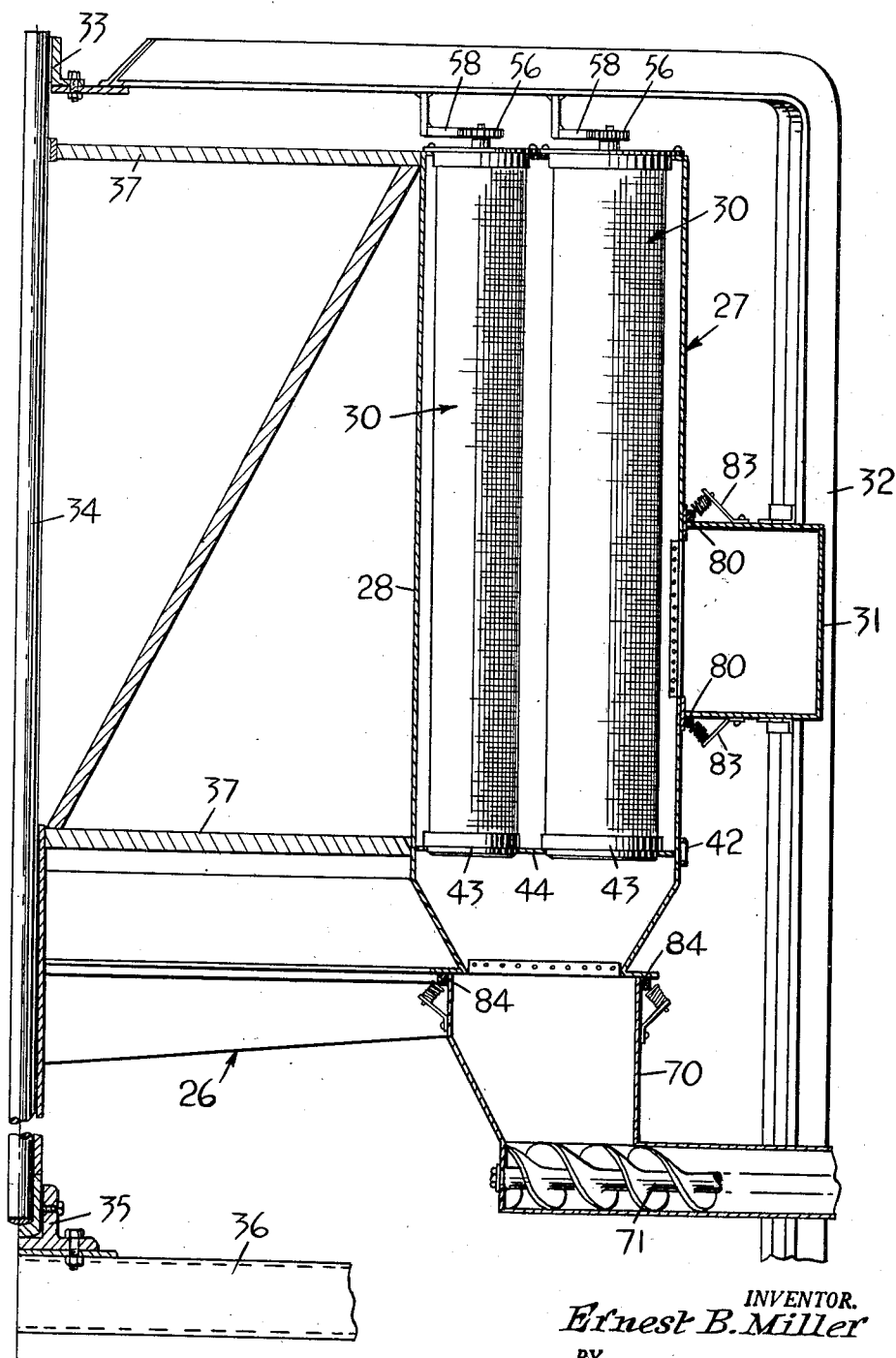

The drum is shown as having a multiplicity of radial diaphragms or partitions 29 dividing it into compartments carrying sets of removable circular screens 30 preferably of woven wire made of a suitable rust-resisting alloy. A side manifold 31 is arranged around the drum and communicates with the various screen compartments well above the bottom manifold (Figs 6a and 6b).

The drum and the manifolds are mounted within a suitable structural frame shown as having four legs carrying the side manifold, and they are bent over the top of the drum, each being connected to a plate carrying an upper, vertical, guide bearing 33 for a central, vertical shaft 34 having a lower step bearing 35 on cross beams 36 (Fig. 6b) near the bottom of the supporting frame. Radial arms or spokes 37 connect the shaft to the drum.

Figure 4:
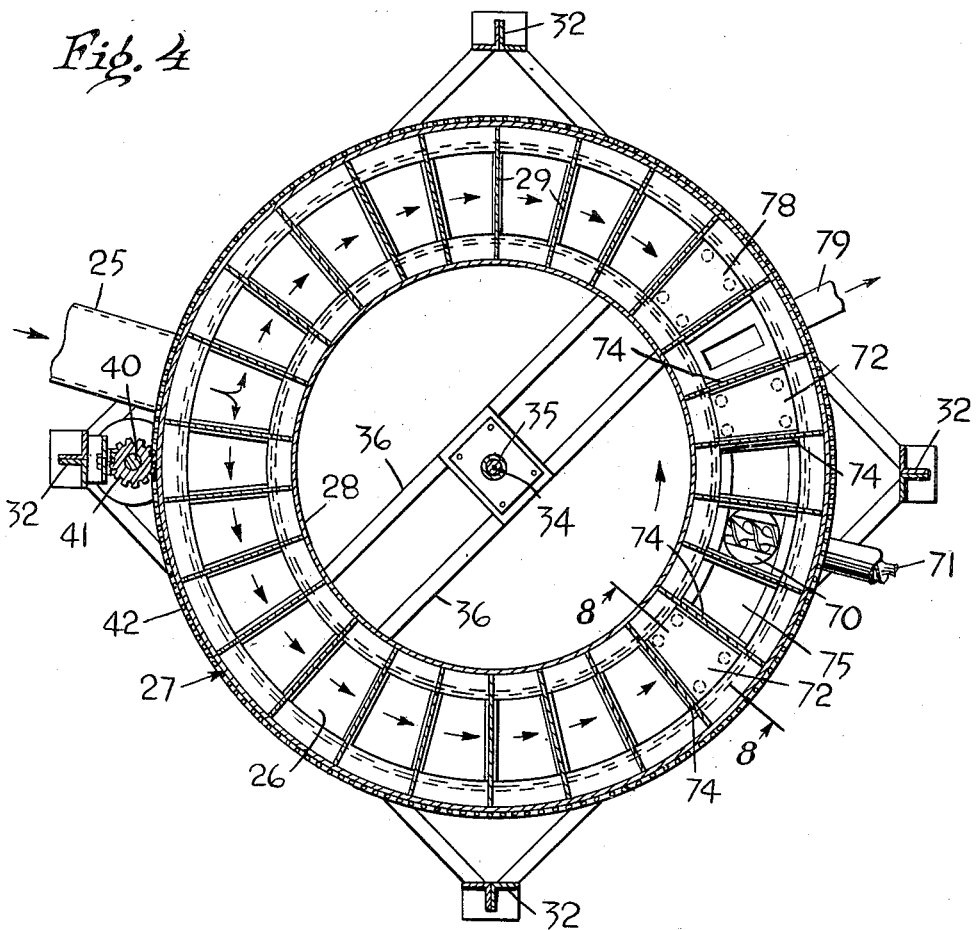
Fig. 4 is a sectional view taken on the line 4—4 of Fig. 2.

A driving motor 38 is shown as being mounted in the lower part of the frame and it has a reduction gear 39 which drives a shaft 40 carrying a pinion 41 meshing with a sprocket chain 42 secured around the bottom part of the drum (Figs. 2 and 4).

Again referring to the screens, as shown in

Figs. 6a and 6b, they have cylindrical bands 43 at their lower ends which rest in openings provided in the bottom wall 44 of the drum. The upper ends of the screens have plain cylindrical bands 45 loosely fitting in openings through the top drum wall 46. To permit vertical expansion of the screen tubes without buckling, flexible spring disks or diaphragms 47 engage the upper edges of the bands. They are secured to and held in place by closure plates 48 suitably bolted or secured to the top wall against asbestos gaskets 49 to make the joints gas-tight.

In this instance, the cylindrical screens are shown as being cleansed by rotating brushes. For this purpose, each screen carries a rotary shaft 50 mounted in a lower bearing provided in a spider 51 and an upper bearing in the closure plate 48. The shafts are shown as being tubular and carry upper and lower brushes 52, each having pairs of stems 53 extending through the shaft and acted upon by compression springs 54 which are carried in small U-shaped brackets 55. Each of the brushes is preferably provided with ordinary spring wire bristles to brush off the deposited carbon particles.

Figure 3:
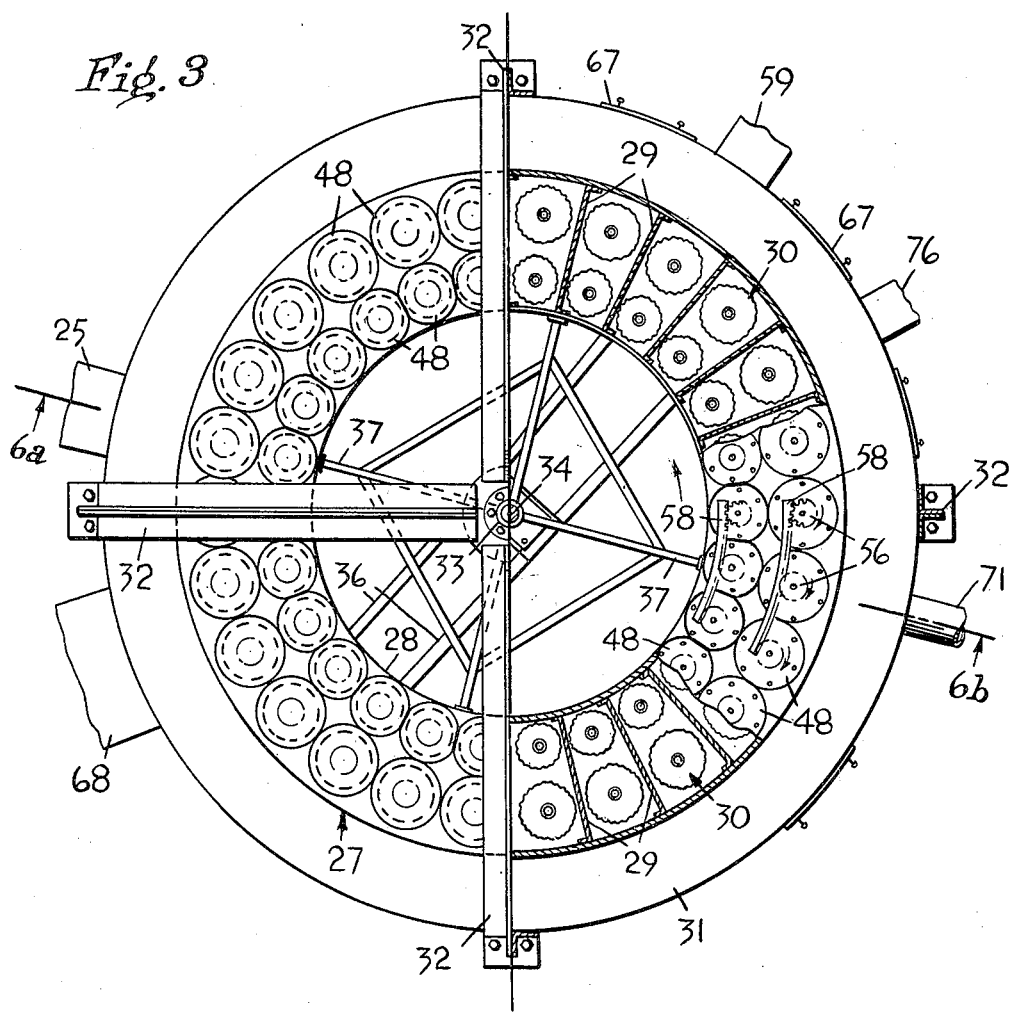
Fig. 3 is a top plan view, parts being shown in section and taken on the line 3—3 of Fig. 2.
Figure 7:
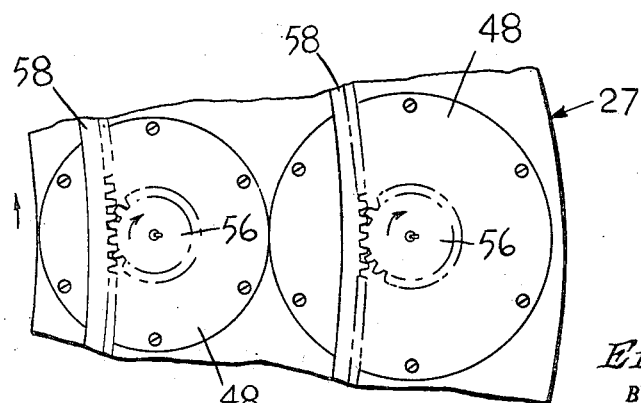
Fig. 7 is a fragmentary top plan view showing the brush operating mechanism.

To rotate the brushes, the shafts are shown as carrying pinions or gears 56 at their upper ends, adapted to engage and mesh with arcuate racks 58 (Figs. 6b and 7), said racks being carried by the stationary frame members and conveniently being of such length as to rotate the brushes in three of the cylindrical screens of each circular row (Fig. 3).

Referring again to Figs. 1 and 5, the carbon-laden gas is shown as being delivered to two screens in one compartment of the drum at a time through the lower manifold to pre-coat the two screens. Inasmuch as some of the carbon particles pass through the screen, the flue gas is returned to the suction side of the blower through a conduit 59 connected to the side manifold. The pre-coat compartment is cut-off from communication with the other compartments by a pair of spaced spring-pressed seals 60 and 61, best shown in Fig. 5. These seals are shown as being mounted between partition walls 62 extending across the side manifold. The seals are curved and have suitable asbestos cloth packings or strips 63 (Fig. 9) to engage the outer ends of the radial diaphragms. Incidentally, each radial diaphragm is shown as carrying a strip 64 of reinforced asbestos cloth adjustably held in place by a bolted sheet-metal plate 65, as shown in Fig. 9, to provide a flexible rubbing edge to engage the seal gaskets. Each seal is shown as having a pair of stems 66 extending through a plate 67 which is secured to the outer wall of the side manifold by means of screws or the like. The arrangement is such that the seals can easily be removed so that the asbestos liners can be inspected and replaced.

As the drum rotates, the screens in one compartment are pre-coated to provide filter layers of carbon particles and move on past the seals, so that the flue gas may pass through them from the bottom manifold and the cleansed or vent gas will pass out through ports into the side manifold.

Figure 5:
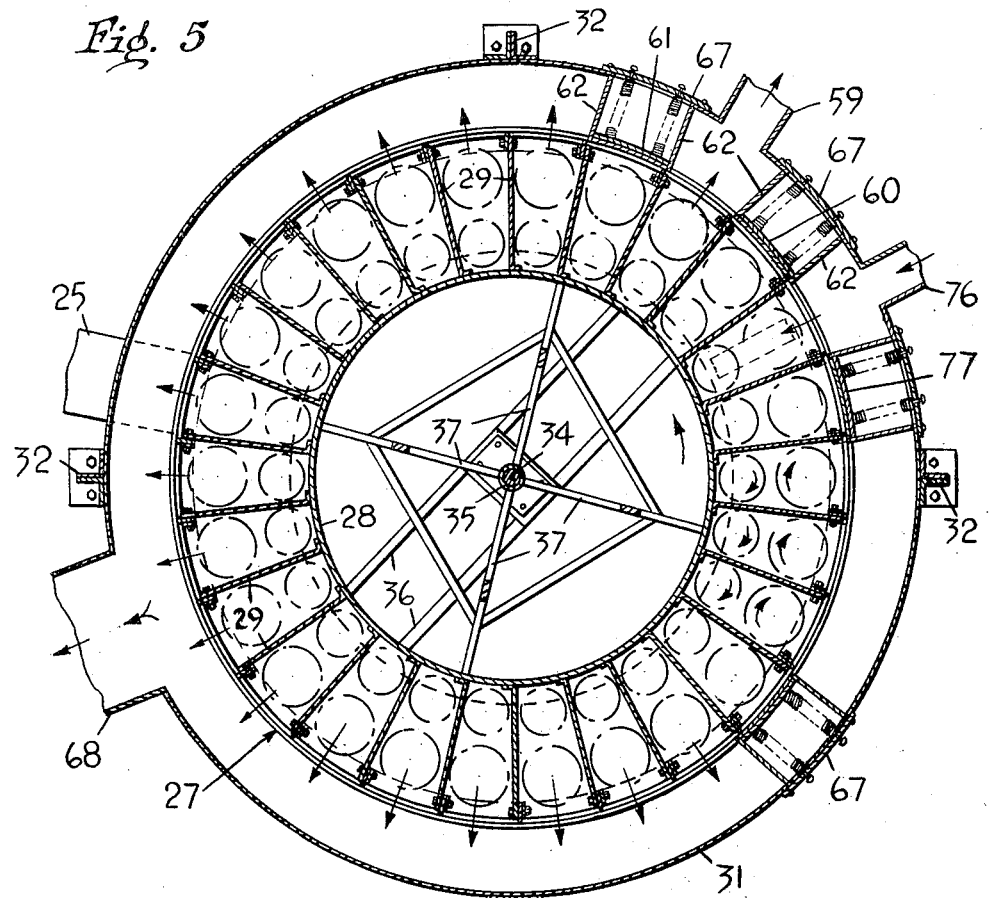
Fig. 5 is a sectional view taken on the line 5—5 of Fig. 2.

In the illustrated example, the flue gas is shown as passing through the screens in seventeen of the compartments; the vent gas passes out through a vent conduit 68 and stack 69, as best shown in Figs. 1 and 5. The drum is rotated very slowly to permit a layer of the particles to accumulate to a sufficient thickness in the screens without unduly retarding the gas flow.

Figure 8:
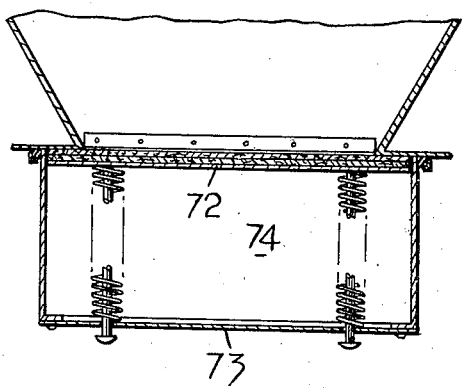
Fig. 8 is an enlarged sectional view of a bottom manifold seal taken on the line 8—8 of Fig. 4.

After the particles are deposited in the screens throughout a major portion of a revolution of the drum, the gears or pinions 56 on the brush shafts are caused to engage the arcuate racks 58, causing the brushes 52 to rotate and dislodge the deposited particles, which fall through the lower manifold into a receiving hopper 70, best shown in Fig. 6b; whence, they are conveyed by an ordinary conveyor 71 to a storage container (not shown). That portion of the lower manifold through which the particles are delivered is shown as being cut off from communication with the rest of the manifold by means of spring-pressed seals 72 carried by closure plates 73, as best shown in Fig. 8. These seals have compartment side walls 74 to prevent the passage of flue gas into that portion of the manifold, wherein the cleaning brushes are being operated. Two such seals 72 are shown in Fig. 4, to segregate the brushes in three of the compartments and all of the brushed-off particles are delivered through an arc-shaped bottom opening 75 into the receiving hopper 70.

After the deposited carbon particles are removed and the screens pass the collecting station, they are further cleansed, one set at a time, by using vent gas to blow out the residual or remaining particles which cling to the inner walls of the screens. Referring to Figs. 1 and 5, some of the vent gas is blown back through a blow-back conduit 76 connected to the stack 69. A blower 77 is connected to the conduit to create sufficient gas pressure to cleanse the screens. Also, there is shown a preheater 78 in the conduit to raise the temperature of gas to between 400° F. and 500° F., and thus prevent the accumulation of naphthalene or other heavy hydrocarbons in the meshes of the screens. If the gas is much cooler, the screens will soon become so badly clogged with such heavy hydrocarbons that the flue gas cannot be blown through them. It has been found that it is highly desirable to cleanse the screens quite thoroughly once during each revolution of the drum.

The blow-back compartment is segregated from the rest of the compartments which communicate with the side manifold by the seal 60 and a similar side seal 77, as best shown in Fig. 5. The blow-back gas enters the side manifold and passes through the screens in the segregated compartment, downwardly through the bottom manifold between bottom seals 72 and 78 and outwardly through a blow-back return conduit 79 which is connected to the T-fitting 3 shown in Fig. 1. The returned, blow-back gas containing residual particles, cleansed from the screens, is recirculated through the lower manifold with the incoming flue gas.

After the screens are cleansed at the blow-back station, they are pre-coated with the filtering layers of carbon particles at the pre-coating station, as has already been explained. Then, the cycle of operations is repeated and the particles are collected continuously.

To prevent the escape of carbon-laden gas between the rotating drum and the side manifold, ring gaskets 80, composed of asbestos or other suitable heat-resisting material, are shown as being spring-pressed against the joints or cracks above and below the manifold. For this purpose, the sealing gaskets are carried by angles 81 against which spring plungers 82, carried by brackets 83, act to hold them in sealing engagement.

Similar sealing ring gaskets 84, on opposite sides of the lower manifold, are spring-pressed against the joints or cracks between the rotating drum and the side walls of that manifold.

The method has been fully described in connection with the explanation of the operation of the collector and it is not necessary here to repeat the sequence of the operations. It is sufficient to state that the method is continuous and is very effective to remove all of the collected particles without clogging up the screens.

Obviously, the invention is not restricted to the particular embodiment thereof herein shown and described, but is capable of a wide variety of modifications within the scope of the appended claims.

What is claimed is:

1. A dust collector comprising, in combination, a vertical rotary drum having a plurality of radial partitions inside the drum dividing it into successive, segmental compartments; cylindrical screens removably mounted in said compartments through the upper end of the drum and having open lower ends; a lower stationary inlet manifold communicating with the lower open ends of most of said screens; an outlet manifold surrounding the drum and communicating with the compartments containing the screens which communicate with the intake manifold; rotary brushes within the screens connected to operate automatically to remove accumulated dust therefrom after the screens pass beyond the intake manifold; a hopper for the removed dust; and a conveyor connected to the hopper.

2. A dust collector, as set forth in claim 1, wherein the lower manifold is arc-shaped and is supported against the lower end of the drum; and wherein the outlet manifold is annular and communicates with said compartments through the side wall of the drum.

3. A dust collector, as set forth in claim 1, wherein spring-urged sealing members are arranged in both manifolds to cut off communication between them and the screens from which the dust is being removed.

4. A dust collector, as set forth in claim 1, wherein a delivery duct for hot, carbon-laden gas is connected to the intake manifold; and wherein both manifolds have seals connected to segregate at least one of said compartments; and a blow-back duct for spent gas connected to the upper manifold to further cleanse the successive screens after the brushes have been operated.

5. A dust collector, as set forth in claim 1, wherein a delivery duct for hot, carbon-laden gas is connected to the intake manifold; and wherein both manifolds have seals segregating at least one of said compartments; a blow-back duct for spent gas connected to the upper manifold to further cleanse the successive screens after the brushes have been operated; a fan-blower in said blow-back duct; and a return duct for the blow-back gas connecting the lower manifold below the segregated compartment to the delivery duct for re-circulation through the screens.

6. A dust collector for recovering carbon black, as set forth in claim 1, wherein spaced seals are arranged in the upper manifold to seal off at least one compartment which communicates with the lower manifold; a return duct connecting the sealed off portion of the manifold with the delivery duct, whereby to permit pre-coating of the screens with carbon black to act as a filter and return of the escaping particles for circulation through the collecting chambers.

7. A dust collector for recovering carbon black, as set forth in claim 1, wherein the manifolds have sealing means cooperating with said partitions for segregating the successive screens after the carbon black is brushed out to provide a gas blow-back station where the residual clinging particles on the screens are removed; and a pre-coating station where fresh carbon particles are deposited on the screens to act as a filter.

8. A carbon black collector comprising in combination, a rotatable annular drum; partitions dividing the drum into a plurality of compartments; at least one screen mounted in each of said compartments; a pair of spaced stationary manifolds communicating with said drum; sealing means carried by said manifolds and cooperating with said partitions to divide said drum and said manifolds into at least two gas-tight sectors; means for delivering carbon-laden gas into one of said sectors to deposit carbon on the screens in said sector; and means in the other sector for removing the deposited carbon from the screens in said sector; and means for rotating the drum whereby said compartments containing said screens are successively moved through each sector.

9. A carbon black collector, as set forth in claim 8, wherein the drum and manifolds are divided into at least three gas-tight sectors and wherein the means for delivering carbon-laden gas to one of said sectors also delivers carbon-laden gas into another sector to pre-coat the screens therein with a filter coat of carbon.

10. A carbon black collector, as set forth in claim 8, wherein the drum and manifolds are divided into four gas-tight sectors; and wherein the means for delivering carbon-laden gas to one of said sectors also delivers carbon-laden gas into another sector to pre-coat the screens therein with a filter coat of carbon; and means for delivering hot gas through the fourth sector to remove clinging residue from the screens therein before they are again pre-coated.

ERNEST B. MILLER.

REFERENCES CITED

The following references are of record in the file of this patent:

UNITED STATES PATENTS

| Number | Name | Date |
|---|---|---|
| 403,798 | Trautmann | May 21, 1889 |
| 917,993 | Blum | Apr. 13, 1909 |
| 1,626,852 | Mangold | May 3, 1927 |
| 1,814,028 | Egli | July 14, 1931 |
| 1,912,784 | Miller et al. | June 6, 1933 |
| 2,344,384 | Altenkirch | Mar. 14, 1944 |